United States Patent Office 3,652,659
Patented Mar. 28, 1972

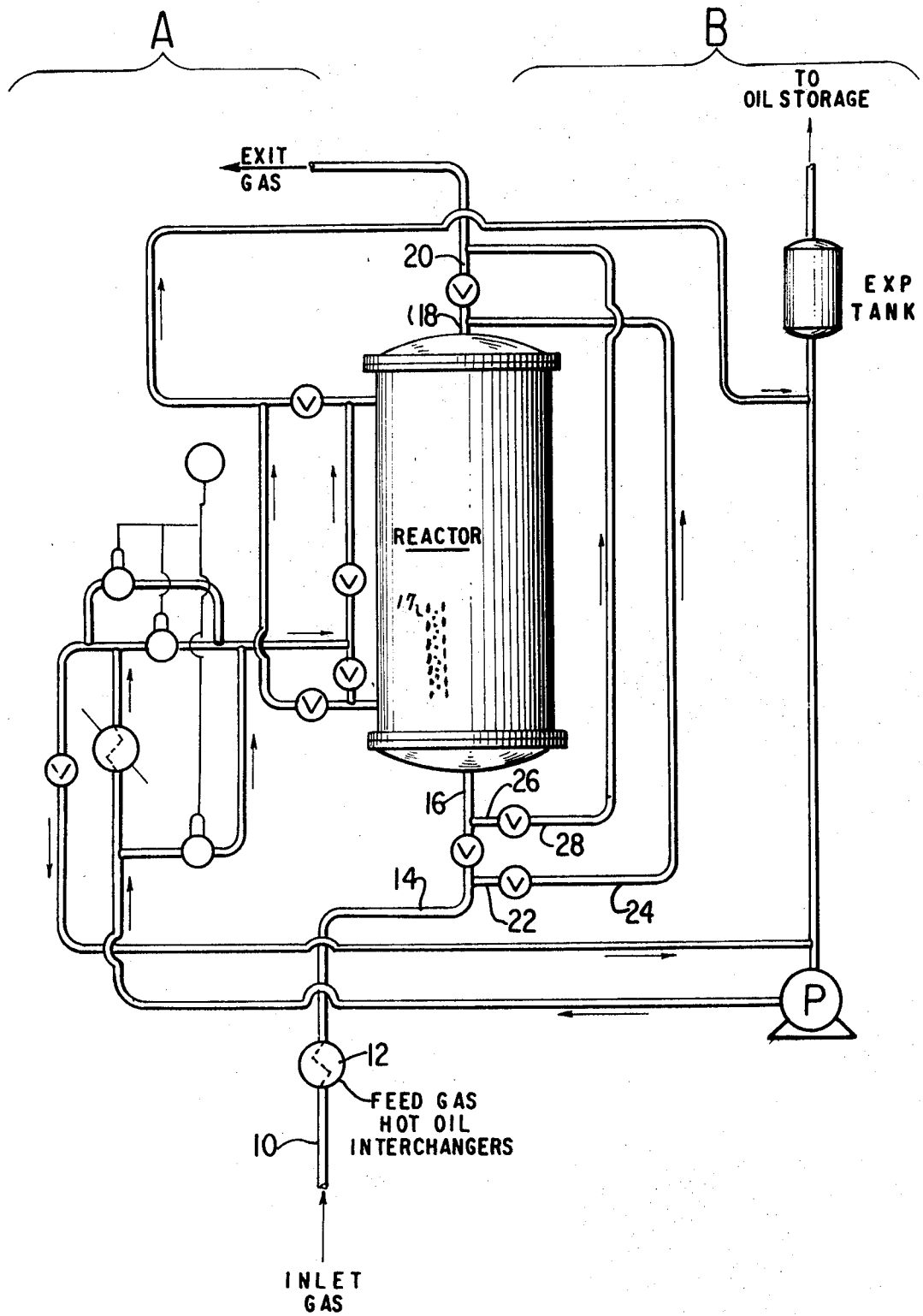

3,652,659
METHOD FOR THE MANUFACTURE OF VINYL ESTERS
Bruno Otto Kruger and James Wilson Waites, Jr., Baton Rouge, La., assignors to Borden, Inc., New York, N.Y.
Filed Aug. 20, 1969, Ser. No. 851,568
Int. Cl. C07c 67/04
U.S. Cl. 260—498
6 Claims

ABSTRACT OF THE DISCLOSURE

Method and apparatus for producing vinyl esters by introducing acetylene and an alkanoic acid in vapor phase into a catalyst containing reaction zone, withdrawing vaporous reaction products therefrom, and periodically changing the direction in which the vapors flow through the reaction zone. The apparatus comprises valved conduit means interconnecting the reactor with the feed and product recovery unit, said means providing a change or reversal of vapor flow in the reactor.

---

This invention relates to the manufacture of vinyl ester monomers and for an improved method and apparatus for their manufacture. More particularly this invention relates to the extension of the useful catalyst life when producing vinyl esters from a carboxylic acid and acetylene over a zinc salt-containing catalyst.

In producing vinyl esters in the vapor phase from the corresponding alkanoic acid and acetylene over a zinc salt-containing catalyst, the zinc salt is gradually carried away from the reactor and eventually there is insufficient zinc available for production of vinyl ester. This catalyst salt is carried away from the reactor and finally discharged with the higher boiling by-products of the reaction as waste.

It has now been found that zinc salt catalyst loss is inhibited and the production of vinyl ester from a given catalyst charge is increased by changing the direction in which the vapors flow in the reactor. This invention also provides apparatus operatively connected to the reactant feed, the reactor and product recovery unit which change the direction in which such vapors flow in the reactor.

It may be pointed out that the process for producing vinyl ester monomer by reacting acetylene and an alkanoic acid over a zinc salt-containing catalyst and the basic apparatus therefor is well known in the art and constitutes no part per se of the present invention. Illustratively, such process and apparatus is disclosed in U.S. Pat. 3,172,733 which issued on Mar. 9, 1965 and said disclosure is incorporated herein by reference. Specifically, the patent disclosure relates to apparatus and process for the production of vinyl acetate by reacting acetylene gas with vaporized glacial acetic acid in the presence of zinc acetate-containing catalyst.

Illustrative of the carboxylic acid reactant there can be mentioned alkanoic acids having from 1 to 4 carbon atoms in the alkyl group such as formic, acetic, propionic and butyric acids. Illustrative of vinyl esters produced by the process of this invention there can be mentioned the vinyl esters having from 1 to 4 carbon atoms in the alkyl group which can be prepared from the above-enumerated alkanoic acids, e.g. such esters include vinyl formate, vinyl acetate, vinyl propionate and vinyl butyrate.

The reaction between the acid and acetylene is exothermic and takes place at an elevated controlled temperature such as that between about 330° F. to 420° F., and particularly for the production of vinyl acetate, between about 330° F. and 400° F. The reaction is conducted at pressures not substantially greater than atmospheric or below atmospheric such as that between 5 and 14 p.s.i.g. and preferably 10 to 12 p.s.i.g. The ratio of acetylene feed rate to acid feed rate on a weight basis, can vary over a wide range. Illustratively, such ratio can vary from about 0.1 to 1 part of acetylene per part of acid and preferably about 0.2 to 0.6 parts of acetylene per part of acid. Generally, acetylene is cycled together with fresh acetylene reactant. The ratio of recycle acetylene to fresh acetylene, by weight can vary over a broad range such as 1:1 to 9:1 and preferably about 4:1.

Generally, the zinc salt is deposited on a carrier such as granular activated charcoal or any other suitable solid support or the zinc salt together with a solid support therefor can be pelletized or extruded from mixtures with powdered charcoal or other suitable inert substances, in combination with a binder. The quantity of zinc salt in relation to its carrier can vary over a wide range. Illustratively, the zinc content of the catalyst can vary from about 5 to 15%, by weight. The term "catalyst" as used herein refers to the zinc salt together with its carrier. Illustrative of the zinc salt which can be used in the catalyst there can be mentioned: zinc salts of phosphoric acid; zinc silicates; and zinc salts of organic acids. Preferred zinc salts are those of alkanoic acids having from 1 to 4 carbon atoms in the alkyl group, e.g. zinc acetate, zinc propionate and zinc butyrate. Preferably when such zinc alkanoates are used, the alkanoate moiety corresponds to the acid reactant and vinyl ester reaction product, e.g. in the preparation of vinyl acetate from acetylene and acetic acid, the preferred catalyst is zinc acetate.

The zinc salt in the catalyst eventually becomes exhausted and produces more by-products and less of the vinyl ester until it is no longer economical to keep it in service. Since the replacement of the catalyst effects the economics of the process due to the catalyst cost and loss of production during exchange, it is of course advantageous to increase its useful life.

In this invention, the useful life of the catalyst is extended by changing and preferably reversing the direction of flow of the various vapors in the reactor. The frequency of such direction of flow change can be varied over a wide range. A useful index for such flow change can be related to the weight of vinyl ester produced in relation to the initial charge of catalyst based on the catalyst zinc content. Thus, the change in direction of flow can advantageously be effected by successively changing the direction of flow after the preparation of about 50 to 1000 pounds of vinyl ester per pound of zinc content in the catalyst charged to the reactor and preferably after the preparation of 150 to 700 pounds of vinyl ester per pound of said zinc content in the catalyst which is charged in the reactor. Such change in flow is preferably effected throughout the operation with a particular catalyst charge or at least in the production of the major portion of total vinyl ester product from a particular catalyst charge. Changing the direction of flow, e.g. once or twice during each week of operation of the catalyst charge is also advantageous. Briefly, the novel apparatus in this invention comprises: a catalyst containing reactor having openings for the ingress and egress of vapors; means for regulating the temperature of said reactor; means for heating reactant vapors prior to their introduction into the reactor; conduit means for carrying away vaporous reaction products from said reactor; conduit means operatively connecting vapor flow from said heating means to the reactor and then to the product conduit; a plurality of valves in said connecting conduit means, said valves having a first position providing flow of reactant vapors into a first opening of the reactor and of vaporous reaction products out of a second opening to the product conduit and said valves having a second position providing a change, preferably a reversal, in the direction of flow of said vapors between openings.

The apparatus and process used in this invention are further illustrated in conjunction with the attached drawing wherein identical numerals refer to identical parts. For the sake of convenience, the operation of the apparatus is described with acetic acid as the alkanoic acid and vinyl acetate as the product. As set forth hereabove other acids, e.g. propionic or butyric can be used as the feed to produce vinyl propionate and vinyl butyrate respectively. The catalyst described in conjunction with the apparatus is zinc acetate, again other catalysts, e.g. zinc propionate or zinc butyrate can be used in the production of any of the vinyl esters. A top portion of the drawing is designated A whereas another top portion is designated B. The apparatus under the portions designated as A and B relate principally to the heating and cooling means for heating the feed gas and maintaining, generally by cooling, the reactor at the specified temperatures.

Vaporous feed gas of acetylene and acetic acid passes through conduit 10 and into heater 12 where it is preheated to about 330° F. to 400° F. The acetylene feed rate is 2530 pounds per hour and the acetic acid feed rate is 7400 pounds per hour. The acetylene feed is made up of recycle and fresh acetylene in a ratio of 4:1 respectively. The preheated feed gas passes into conduit 14 then through valve 3, conduit 16 and finally into the reactor. At this stage valves 1 and 2 are closed. The reactor is a cylindrical 37 foot high by 12 foot diameter reactor with 5,100 vertical tubes containing a total of 40,000 pounds of catalyst. The weight of zinc in the catalyst mass is 10% thereof. The catalyst mass fills completely all of the tubes in the reactor. Some of the catalyst is indicated by stipples in a portion of a tube, shown in broken lines within the reactor. The temperature in the reactor is maintained at 330 to 400° F. by heat exhcange oil surrounding the catalyst tubes and the pressure is maintained at 10 to 12 p.s.i.g. The temperature in the reactor is controlled by the heating and cooling system shown under sections A and B of the drawing. The feed gas passes upwardly through the catalyst in the reactor. The acetylene reacts with the acetic acid in the presence of the catalyst to produce vinyl acetate. Vaporous vinyl acetate together with unreacted reactant gases and vaporous by-products pass out of the reactor through conduit 18, valve 4 and finally through conduit 20.

The catalyst in the above run is zinc acetate deposited on granular activated charcoal. The original zinc content in the 40,000 pounds of catalyst is 10%, that is, 4,000 pounds. As set forth above, the flow is upward during the start-up of the reactor with new catalyst. After the initial production of 1,000,000 pounds of vinyl acetate, the flow of vapor in the reactor is reversed. This is accomplished by closing valves 3 and 4 while simultaneously opening valves 1 and 2. With this arrangement of the valves, the vaporous feed of acetylene and acetic acid flows through conduit 22, valve 1, conduit 24, conduit 18 and finally into the reactor. Again, the reactant vapors are converted to vinyl acetate in the vapor phase while, in this case, moving downwardly through the catalyst mass. The vaporous product then passes through conduit 16, valve 2, conduit 28 and finally into exhaust gas conduit 20. This arrangement of the valves with downward flow in the reactor is also continued until 1,000,000 pounds of vinyl acetate are produced. On producing of this second one million pounds of vinyl acetate, the positioning of the valves 1, 2, 3 and 4 is again changed so that the reactant feed flows through valve 3, conduit 16, upwardy through the reactor and then through conduit 18 and valve 4 into conduit 20. The reversal in the direction of flow is continued on the production of each successive one-million pounds of vinyl acetate until substantial exhaustion of the catalyst. By following this procedure of reversing the direction of flow, it is possible to obtain 30% more of the vinyl acetate as compared to having the flow in one direction throughout the life of the catalyst charge.

In experiments conducted by applicants it has been found that the zinc salt in the catalyst has a strong tendency to shift within the catalyst mass and eventually leave the reactor if changes in direction of flow are not effected. Thus, in a run wherein the reversal of vaporous flow in the reactor was not effected throughout the useful life of the catalyst charge in substantially the same equipment and operating conditions shown above, except for the valving and associated conduits for effecting such flow reversal, it was found that the zinc content in the catalyst had shifted along the direction of flow during the useful life of the catalyst charge. Although the catalyst, as originally charged, contained a 10.77% zinc content, it was found that at the bottom of the reactor, where the reactants entered the reaction zone, the zinc content was reduced to 4.85% and at the top of the reactor, where unreacted reactants left with the product vapor, the zinc content had increased to 17.7% which is substantially above the zinc content of the original catalyst charge.

Ratios, parts and percentages given herein are on a weight basis unless otherwise specified.

What is claimed is:

1. In a method for producing a vinyl ester from the corresponding alkanoic acid having from 1 to 4 carbon atoms in the alkyl group and acetylene, by introducing a vaporous stream of said acetylene and acid reactants into a reaction zone containing a catalytically effective quantity of a zinc salt, reacting said reactants in the presence of said salt to produce said ester reaction product and withdrawing a vaporous stream of said reaction product from said reaction zone wherein the vapors in said zone flow from the locus of introduction of the reactants to the locus of withdrawal therefrom, the improvement which comprises periodically reversing the direction in which said vapors flow within said reaction zone.

2. A method of claim 1 wherein; zinc salt is a zinc alkanoate wherein said alkyl group has from 1 to 4 carbon atoms and the reaction is conducted at a temperature of 330° F. to 420° F. at a pressure of 5 to 14 p.s.i.g.

3. A method of claim 2 wherein the direction of flow of said vapors in the reaction zone is reversed after the preparation of from about 50 to 1,000 pounds of vinyl ester per pound of zinc content in the catalyst.

4. A method of claim 3 wherein said reactants enter said zone at one end thereof and the reaction product is withdrawn from substantially the opposite end of said zone.

5. A method for producing vinyl acetate from acetic acid and acetylene by introducing a vaporous stream of said acetylene and acetic acid reactants in a ratio of about 0.1 to 1 part of acetylene per part of acetic acid into one end of a cylindrical reactor containing a catalytically effective quantity of zinc acetate, reacting said reactants at a temperature between about 330° F. and 420° F. at a pressure of about 5 to 14 p.s.i.g. in the presence of said zinc acetate to produce vinyl acetate while simultaneously withdrawing a vaporous stream of said vinyl acetate from the opposite end of said reactor, the improvement which comprises reversing the direction of flow of said streams between said opposite ends of the reactor.

6. A method of claim 5 wherein the direction of flow is successively reversed after the preparation of 150 to 750 pounds of vinyl acetate per pound of zinc content in the catalyst.

References Cited
UNITED STATES PATENTS 3,172,733   3/1965   Karnofsky _____ 260—498

LORRAINE A. WEINBERGER, Primary Examiner

V. GARNER, Assistant Examiner

U.S. Cl. X.R.

23—289